(12) United States Patent
Yeager et al.

(10) Patent No.: US 10,261,968 B2
(45) Date of Patent: *Apr. 16, 2019

(54) METHOD AND APPARATUS FOR NAVIGATIONAL SEARCHING OF A WEBSITE

(71) Applicant: Bank of America Corporation, Charlotte, NC (US)

(72) Inventors: Stephen Yeager, Seattle, WA (US); Marco Ramirez, Burien, WA (US); Brad Sadler, San Francisco, CA (US)

(73) Assignee: Bank of America Corporation, Charlotte, NC (US)

( * ) Notice: Subject to any disclaimer, the term of this patent is extended or adjusted under 35 U.S.C. 154(b) by 130 days.

This patent is subject to a terminal disclaimer.

(21) Appl. No.: 15/620,959

(22) Filed: Jun. 13, 2017

(65) Prior Publication Data

US 2017/0277788 A1  Sep. 28, 2017

Related U.S. Application Data

(63) Continuation of application No. 14/337,339, filed on Jul. 22, 2014, now Pat. No. 9,710,558.

(51) Int. Cl.
  *G06F 17/30* (2006.01)
  *G06F 16/951* (2019.01)
  *G06Q 40/02* (2012.01)

(52) U.S. Cl.
  CPC .......... *G06F 16/951* (2019.01); *G06Q 40/02* (2013.01)

(58) Field of Classification Search
  CPC ......... G06F 17/30864; G06F 17/30554; G06F 17/3087; G06F 17/30991; G06F 17/30696; G06F 17/30395; G06F 17/30646
  See application file for complete search history.

(56) References Cited

U.S. PATENT DOCUMENTS

| | | |
|---|---|---|
| 5,386,556 A | 1/1995 | Hedin et al. |
| 6,594,657 B1 | 7/2003 | Livowsky |
| 6,598,039 B1 | 7/2003 | Livowsky |
| 7,577,665 B2 | 8/2009 | Ramer et al. |
| 7,724,889 B2 | 5/2010 | Bushey et al. |
| 7,797,635 B1 | 9/2010 | Denise |
| 7,917,497 B2 | 3/2011 | Harrison et al. |
| 8,484,031 B1 | 7/2013 | Yeracaris et al. |

(Continued)

*Primary Examiner* — Ariel Mercado
(74) *Attorney, Agent, or Firm* — Weiss & Arons LLP; Michael A. Springs, Esq.

(57) ABSTRACT

Methods may display an interactive searching display window on a webpage. Methods may display a search box located on the interactive searching display window, which may enable a user to type in a query. Methods may display an answer box located on the interactive searching display window, which may display an answer to a user's query. Methods may display a minimize button, a maximize button and a pin button, which may allow the user to pin the interactive searching display window to one side of the webpage. Methods may redirect the user to a second webpage in response to the determination that greater than a threshold probability exists that the answer to the user's question may be found on the second webpage. Methods may display the interactive searching display window about a central location on the second webpage for a time period between 1.5 and 3.5 seconds.

20 Claims, 11 Drawing Sheets

(56) References Cited

U.S. PATENT DOCUMENTS

| | | |
|---|---|---|
| 8,554,869 B2 | 10/2013 | Garg et al. |
| 8,560,321 B1 | 10/2013 | Yeracaris et al. |
| 8,676,828 B1 | 3/2014 | Agarwal et al. |
| 2005/0010563 A1 | 1/2005 | Gross et al. |
| 2007/0244900 A1 | 10/2007 | Hopkins et al. |
| 2010/0082634 A1 | 4/2010 | Leban |
| 2011/0225502 A1 | 9/2011 | BlahaErath et al. |
| 2013/0013616 A1 | 1/2013 | Leidner et al. |
| 2013/0031076 A1* | 1/2013 | Bhola ............... G06F 17/3066 707/706 |
| 2013/0159923 A1* | 6/2013 | French ............. G06F 17/30899 715/790 |
| 2014/0129540 A1 | 5/2014 | Riley et al. |
| 2014/0250145 A1 | 9/2014 | Jones et al. |

* cited by examiner

FIG. 11

METHOD AND APPARATUS FOR NAVIGATIONAL SEARCHING OF A WEBSITE

CROSS-REFERENCE TO RELATED APPLICATION

This patent application is a continuation of U.S. patent application Ser. No. 14/337,339, now U.S. Pat. No. 9,710,558, entitled, "METHOD AND APPARATUS FOR NAVIGATIONAL SEARCHING OF A WEBSITE", filed Jul. 22, 2014, which is hereby incorporated by reference herein in its entirety.

FIELD OF TECHNOLOGY

This invention relates to webpage searching.

BACKGROUND OF THE DISCLOSURE

Many users find that interactive website search fields lack ease of accessibility for a number of different reasons. One reason is when a user types a query into a search box he may be redirected to a second webpage where he is prompted to choose from a list of webpages. Some users, however, would prefer to view the list of webpages while remaining on the current webpage.

Also, many times a user types a query into a website search box, and is presented with a large list of different webpages to choose from. This may confuse a user who would prefer an answer to the query he presented, as opposed to an entire list of results where the answer to his or her query may or may not be found.

Therefore, there is a need for an interactive webpage searching display window, which may enable a user to remain on the current webpage while viewing the list of webpages responsive to the query. The list of available webpages should preferably include at least one webpage which contains the answer to the user's query, or a short list of related webpages, to simplify the user's searching experience.

SUMMARY OF THE INVENTION

An apparatus for navigational searching of a webpage is provided. The apparatus may include a webpage. The apparatus may include a processor. The apparatus may include an interactive searching display window. The interactive searching display window may include a search box. The search box may enable a user to type in a query. The interactive searching display window may include an answer box. The answer box may be configured to display an answer to the user's query. The answer to the user's query may be determined by the processor. The interactive searching display window may include a minimize button. The minimize button may be configured to reduce the display area of the interactive searching display window. The interactive searching display window may include a maximize button. The maximize button may be configured to increase the display area of the interactive searching display window. The interactive searching display window may include a pin button. The pin button may be configured to allow the user to pin the interactive display window to a specific place on the browser document window.

The processor may be configured to redirect the user to a second webpage. The redirection may be in response to the processor determining that greater than a threshold probability exists that the answer to the user's query is found on the second webpage. The processor may be configured to electronically notify the user, via a message in the answer box, that he has been redirected to the second webpage. The processor may be further configured to display the interactive searching display window about a central location of the second webpage for a pre-determined time period. The time period may be not less than 1.5 seconds and not more than 3.5 seconds.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 11 shows an illustrative GUI in accordance with the principles of the invention.

DETAILED DESCRIPTION OF THE DISCLOSURE

Figure 1:
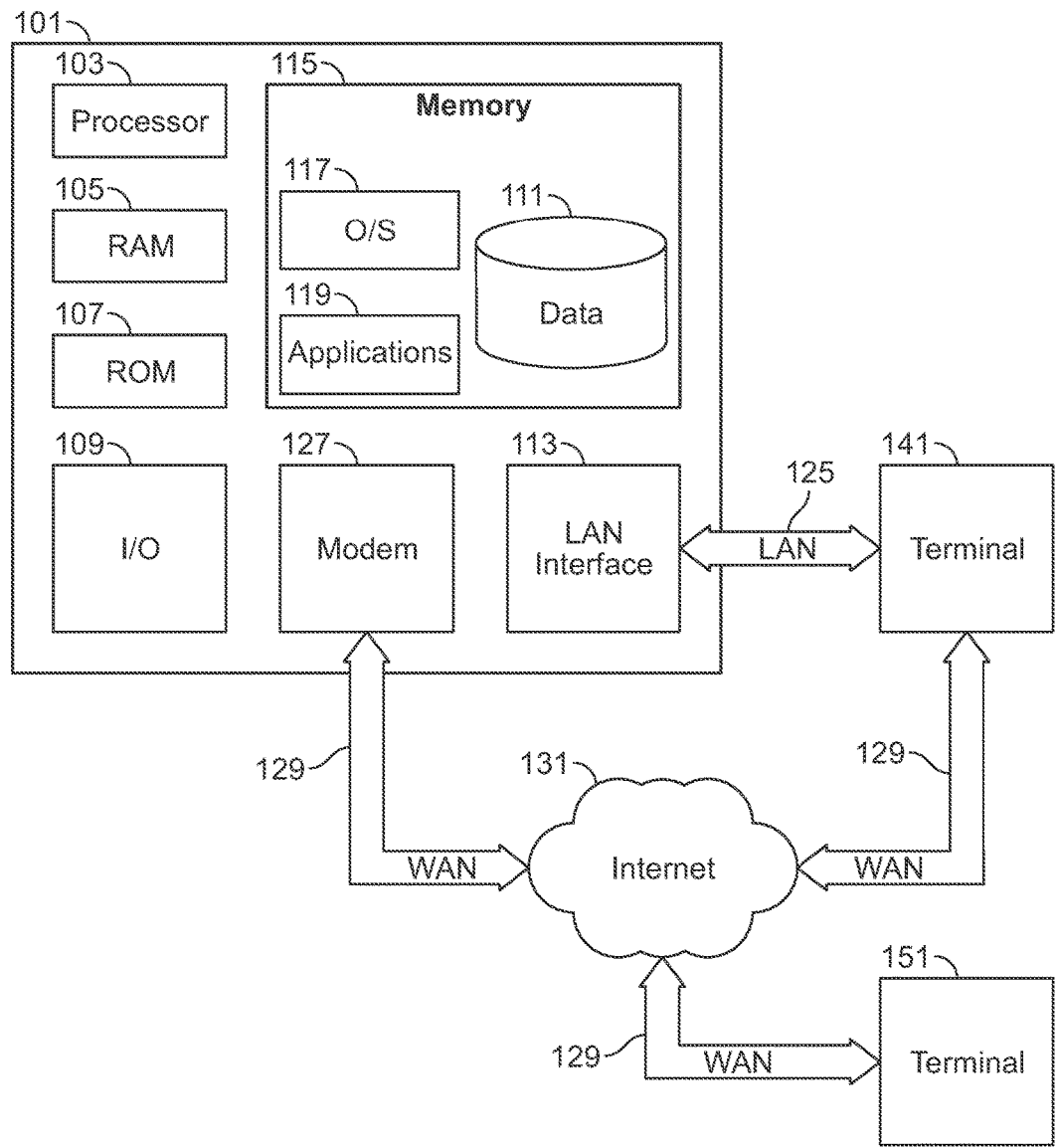
FIG. 1 shows an illustrative apparatus in accordance with principles of the invention.

Apparatus and methods for navigational searching of a webpage are provided. Such apparatus and methods may include computer hardware and software that are compatible with the internet and the worldwide web.

The apparatus may be configured to display a webpage on a user's workstation display. The apparatus may include a processor. The apparatus may include an interactive searching display window. The interactive searching display window may include a search box. The search box may enable a user to type in a query.

In another embodiment, the search box may enable a user to enter a query in a different manner, such as, a voice command device, a handwriting recognition touch interface, a touch screen or any other suitable input/output device. The search box may also function using type-ahead functionality.

The interactive searching display window may include an answer box. The answer box may be configured to display an answer to the user's query. The answer may be determined by the processor.

In another embodiment, the answer may be displayed to the user in a different manner, such as, an audio output device, or any other suitable input/output device.

The interactive searching window may include a minimize button. The minimize button may be configured to reduce a display area of the interactive searching display window.

The interactive searching display window may include a maximize button. The maximize button may be configured to increase a display area of the interactive searching display window.

The interactive searching display window may include a pin button. The pin button may be configured to allow a user to pin the interactive searching display window to a specific place on the webpage.

The processor may be configured to redirect the user to a second webpage in response to the processor determining that greater than a threshold probability exists that the answer to the user's question may be found on the second webpage.

The processor may be configured to electronically notify the user that he has been redirected to the second webpage. The electronic notification may be a message in the answer box.

The processor may be configured to display the interactive searching display window about a central location, or any other suitable location, of the second webpage for a pre-determined time period. The time period may be not be less than 1.5 seconds and not more than 3.5 seconds. The time period of not less than 1.5 seconds and not more than 3.5 seconds may allow the brain of the user to comprehend that he has been redirected to the second webpage, but not to be frustrated by the ongoing at least partial concealment of the second webpage.

The processor may be further configured to move the interactive searching display window to one side of the second webpage after the time period of not less than 1.5 seconds and not more than 3.5 seconds has elapsed. Moving the interactive searching display window after the time period has elapsed may enable a user to view the second webpage without requiring the user to manually move the interactive searching display window. The time period of between 1.5 until 3.5 seconds may be enough time to enable the user to comprehend the redirection that has taken place, but not conceal the user's view of the second webpage for too long. This is because concealment of the second webpage for an extended period of time—e.g. more than 3.5 seconds—may disturb the user's view of the second webpage, and may frustrate the user. The shift of the interactive searching display window after the elapse of the time period of between 1.5 and 3.5 seconds may be enough time to enable the user to comprehend that the interactive searching display window can be pinned to the side of the webpage, and can be unpinned using the pin button.

The processor may be further configured to display the interactive searching display window pinned to one side of the second webpage. The side of the second webpage may be a right side, a left side, a top side, or a bottom side.

The processor may be configured to determine that there is insufficient display area on the second webpage for pinning of the interactive searching display window. The processor may be configured not to display the pin button to the user upon the determination that there is insufficient display area on the second webpage for pinning.

The answer to the user's question may be based in part on the user's personal information, for example, the user's name, phone number, address, the number of accounts associated with the user, the monetary size of the user's accounts, the monetary size of the user's home equity loan or mortgage, user's account history, etc.

The answer to the user's questions may be based in part on prior user searches, or any other suitable general or specific user information.

The processor may be configured to retain the state of the search box and the answer box, following redirection from the first webpage to the second webpage.

In another embodiment, the processor may be configured to display a plurality of webpage links in the answer box. The links may be displayed in response to the processor determining that greater than a threshold probability exists that the answer to the user's question may be found on each of the webpages. In some embodiments, the processor may be configured to display the probability, as a percentage, that the answer may found on the individual webpage.

In this embodiment, the processor may be configured to redirect the user, for each webpage, to a second webpage in response to the user clicking on one of the plurality of webpage links. The webpage link which the user clicks on may correspond to the second webpage.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

FIG. 1 is an illustrative block diagram of system 100 based on a computer 101. The computer 101 may have a processor 103 for controlling the operation of the device and its associated components, and may include RAM 105, ROM 107, input/output module 109, and a memory 115. The processor 103 will also execute all software running on the computer—e.g., the operating system. Other components commonly used for computers such as EEPROM or Flash memory or any other suitable components may also be part of the computer 101.

The memory 115 may be comprised of any suitable permanent storage technology—e.g., a hard drive. The memory 115 stores software including the operating system 117 any application(s) 119 along with any data 111 needed for the operation of the system 100. Alternatively, some or all of computer executable instructions may be embodied in hardware or firmware (not shown). The computer 101 executes the instructions embodied by the software to perform various functions.

Input/output ("I/O") module may include connectivity to a microphone, keyboard, touch screen, and/or stylus through which a user of computer 101 may provide input, and may also include one or more speakers for providing audio output and a video display device for providing textual, audiovisual and/or graphical output.

System 100 may be connected to other systems via a LAN interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program(s) 119, which may be used by computer 101, may include computer executable instructions for invoking user functionality related to communication, such as email, Short Message Service (SMS), and voice input and speech recognition applications.

Computer 101 and/or terminals 141 or 151 may also be devices including various other components, such as a battery, speaker, and antennas (not shown).

Terminal 151 and/or terminal 141 may be portable devices such as a laptop, cell phone, Blackberry TM, or any other suitable device for storing, transmitting and/or transporting relevant information. Terminals 151 and/or terminal 141 may be other devices. These devices may be identical to system 100 or different. The differences may be related to hardware components and/or software components.

Figure 2:
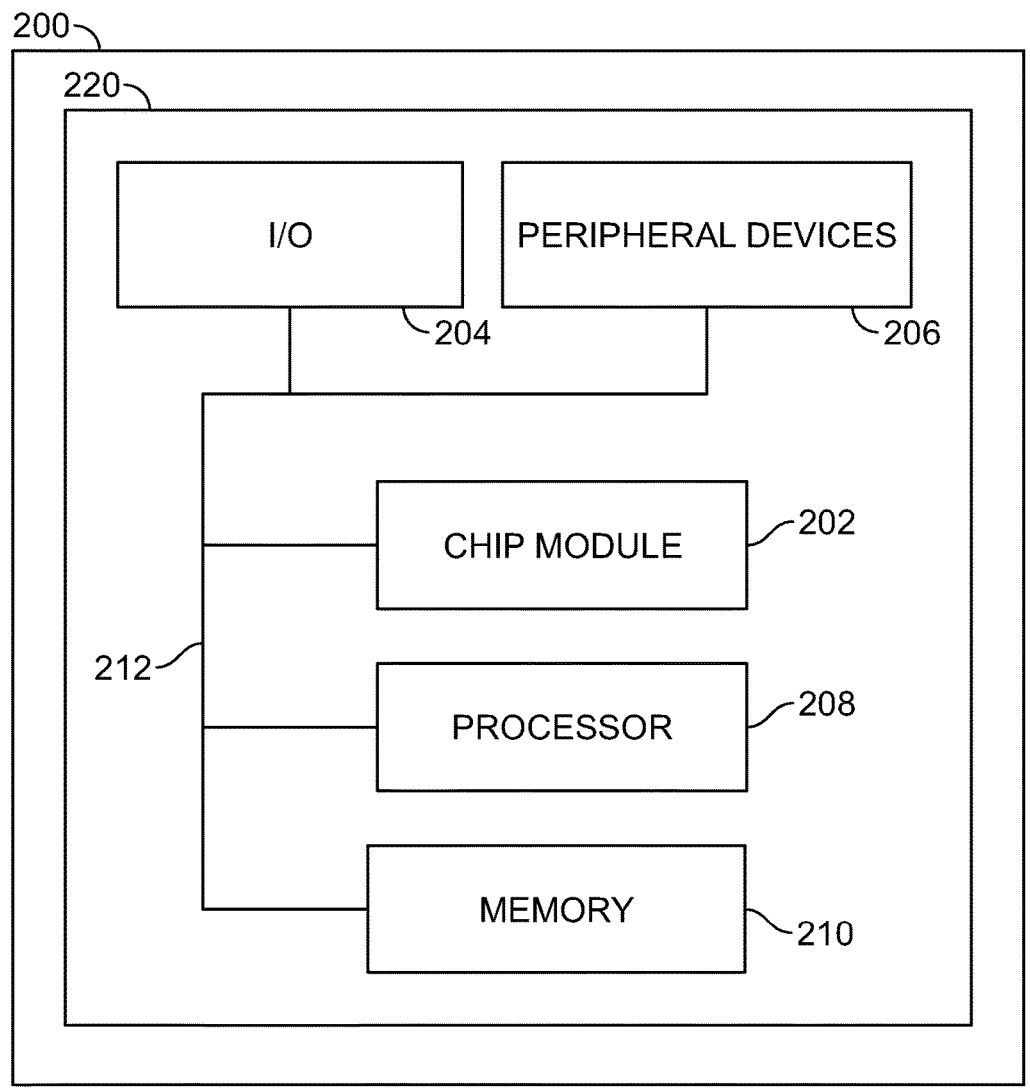
FIG. 2 shows an illustrative apparatus in accordance with the principles of the invention.

FIG. 2 shows illustrative apparatus 200. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may compute data structural information, structural parameters of the data, quantify indices; and machine-readable memory 210.

Machine-readable memory 210 may be configured to store in machine-readable data structures: information pertaining to a user, information pertaining to an account holder and the accounts which he may hold, the current time, information pertaining to a credit or debit card user and any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
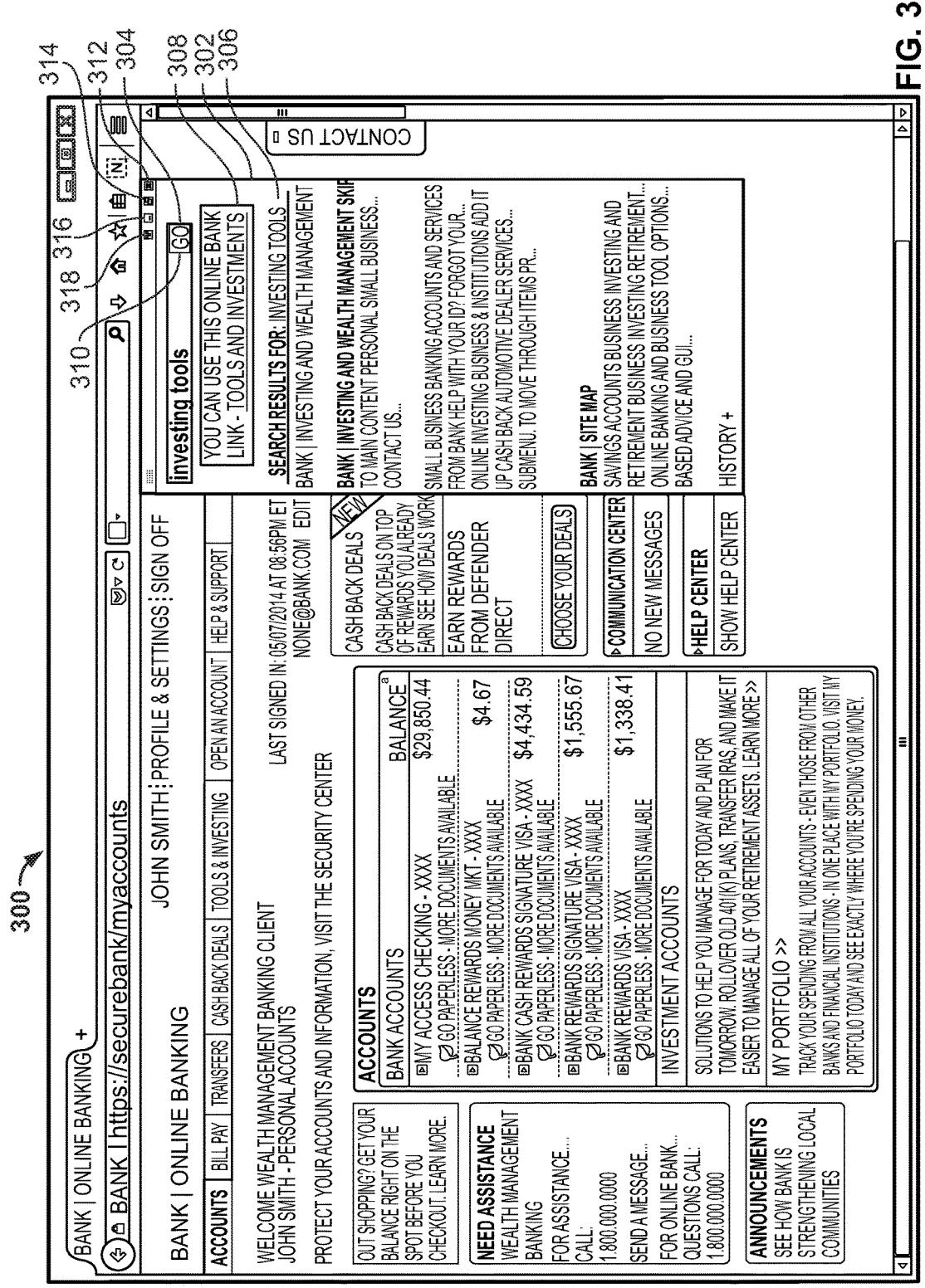
FIG. 3 shows an illustrative graphical user interface ("GUI") in accordance with the principles of the invention.

FIG. 3 shows an illustrative GUI webpage 300. Interactive searching display window 302 may contain search box 304. A user of webpage 300 may have typed "investing tools" into search box 304. The user may click GO button 310 to begin the search. The user may also press the enter key, or any other suitable key to begin the search. Answer box 306 provides the user an option to click on link 308, titled "tools and investments". Directly under link 308, there are presented options of different webpages and information that pertain to the user's question. Included in the list are bank investing and wealth management, small business banking accounts and services, bank site map, etc. In addition to the pertinent information, there is a history link, which may enable a user to expand the interactive searching display window and view his previous searching history.

Close button 312 may enable the user to close the interactive searching display window. Maximize button 314 may enable the user to increase the size of the interactive searching display window. Minimize button 316 may enable the user to reduce the size of the interactive searching display window. Pin button 318 may enable the user to pin the interactive searching display window to one side of webpage 300.

Figure 4:
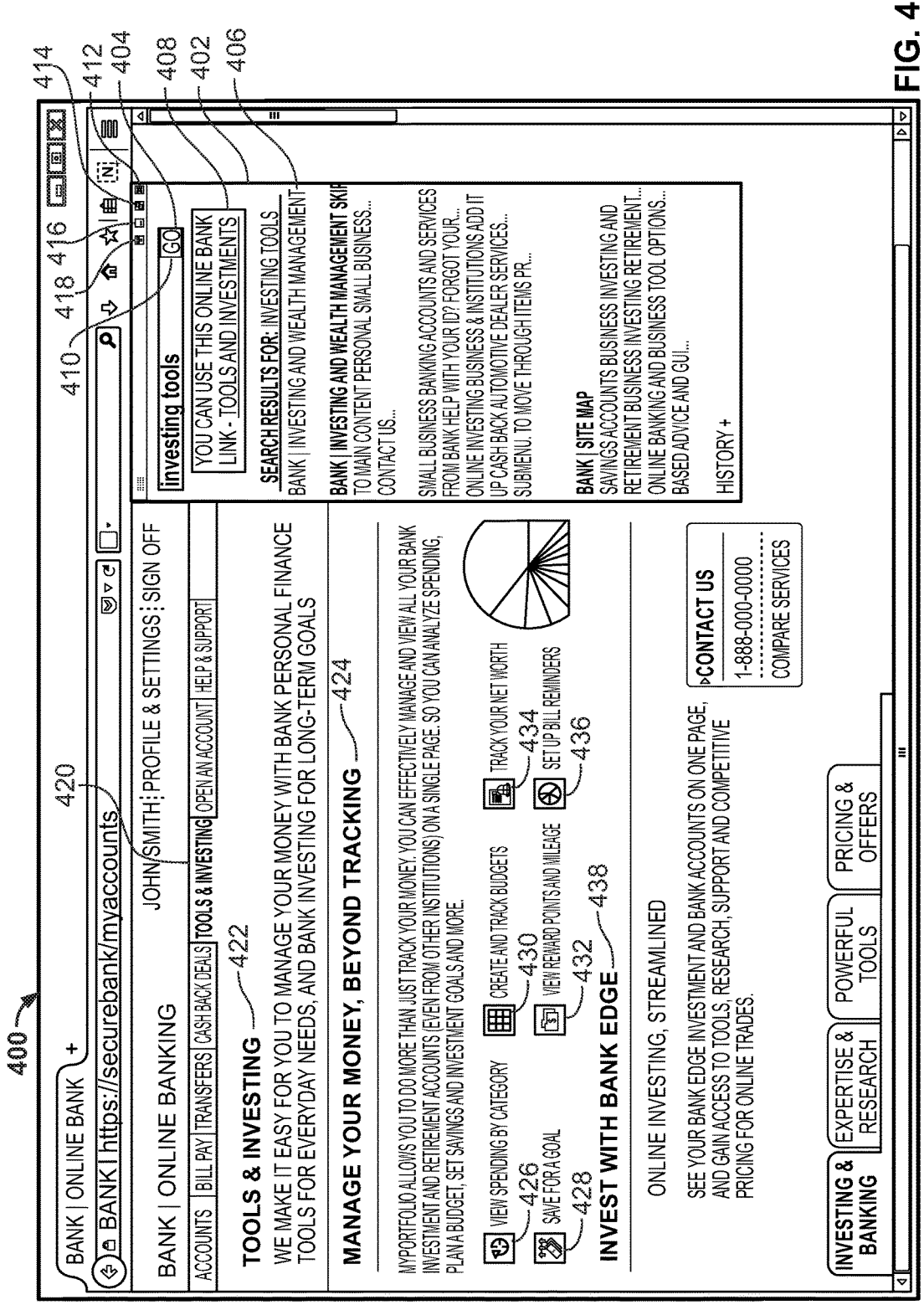
FIG. 4 shows an illustrative GUI in accordance with the principles of the invention.

FIG. 4 shows an illustrative GUI webpage. The user of webpage 300, may have clicked link 308. In response to clicking link 308, the user may have been redirected to webpage 400. In certain embodiments, interactive searching display window 402 may substantially constantly retain, following the redirection, its original state prior to the redirection, as shown in search box 404, link 408, answer box 406, close button 412, maximize button 414, minimize button 416 and pin button 418. The answer to the user's question may be displayed on webpage 400. Tab 420 shows webpage 400 may pertain to tools and investing. Heading 422 depicts the heading of the webpage, "tools and investing". Subheading 424 describes the heading in other words, "manage your money, beyond tracking". Clicking on button 426 may redirect the user to another webpage pertaining to "view spending by category". Clicking on button 428 may redirect the user to another webpage pertaining to "save for a goal". Clicking on button 430 may redirect the user to another webpage pertaining to "create and track budgets". Clicking on button 432 may redirect the user another webpage pertaining to "view reward points and mileage". Clicking on button 434 may redirect the user to another webpage pertaining to "track your net worth". Clicking on button 436 may redirect the user to another webpage pertaining to "set up bill reminders". Subheading 438 describes investing with a particular vendor.

Figure 5:
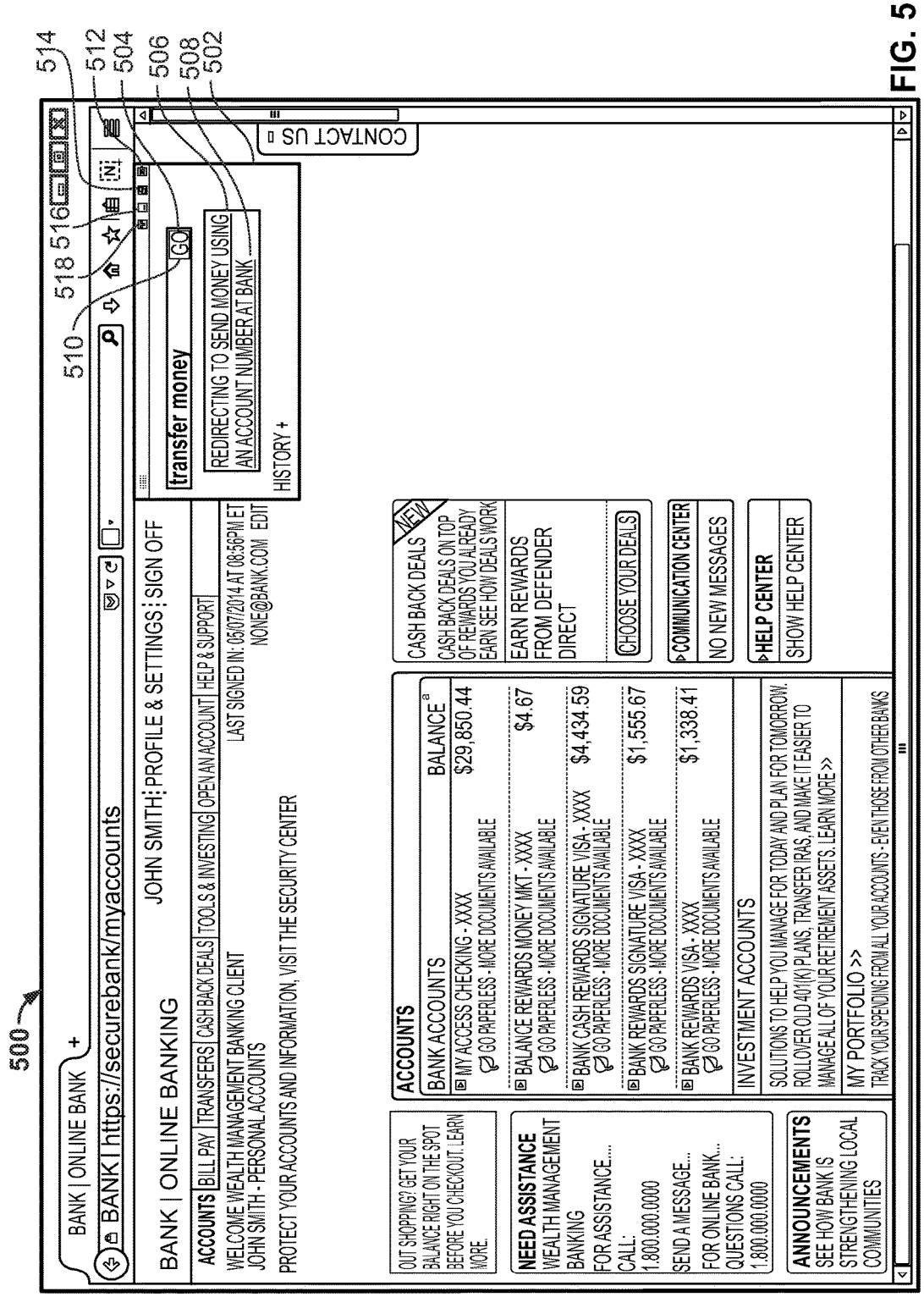
FIG. 5 shows an illustrative GUI in accordance with the principles of the invention.

FIG. 5 shows a GUI webpage. Interactive searching display window 512 may contain search box 514, close button 512, maximize button 514, minimize button 516 and pin button 518. The user may have typed "transfer money" into search box 504. The processor may determine that greater than a threshold probability exists that the answer to the user's question may be found on webpage 600, as shown below in the portion of the specification corresponding to FIG. 6.

In response to the processor's determination that the answer to the user's question may be found on webpage 600, the user may be electronically notified, via message 508 in answer box 506 that he has been redirected to a second webpage.

Figure 6:
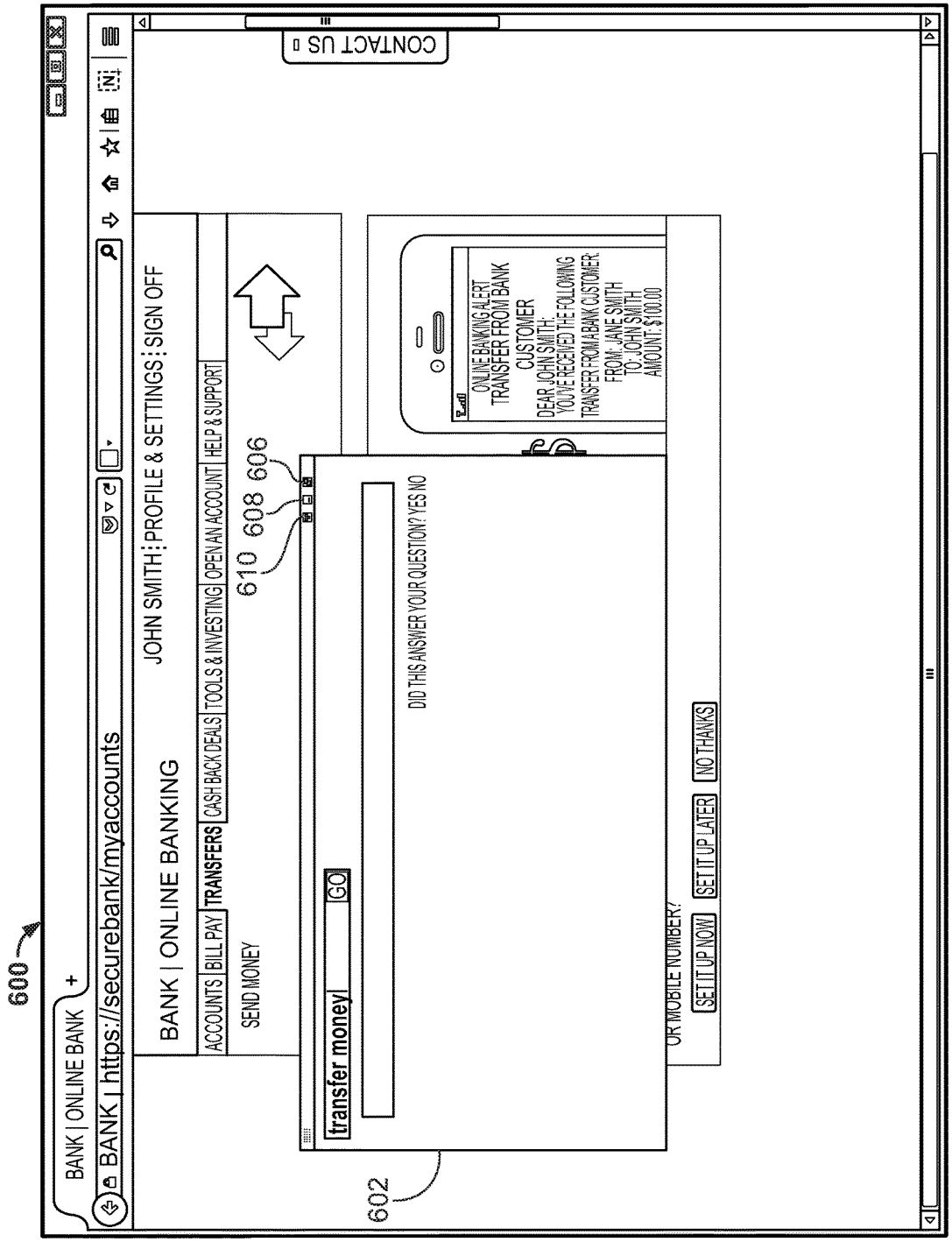
FIG. 6 shows an illustrative GUI in accordance with the principles of the invention.

FIG. 6 shows a GUI webpage. There may not be sufficient room on webpage 600 to display the interactive searching window pinned to one side of webpage 600. The user of webpage 600 may have typed "transfer money" into interactive search box 602. Interactive searching display window 602 is shown on top of webpage 600. Webpage 600 may remain active and usable while interactive searching display window is on top of webpage 600. Interactive searching display window may appear about a central location on top of webpage 800 for a time period of not less than 1.5 seconds and not more than 3.5 seconds. The time period of 1.5 to 3.5 seconds may allow the user to understand that he has been redirected to webpage 800. The appearance of interactive searching display window 602 on top of webpage 800 for a time period of 1.5 to 3.5 seconds may appear to the user to be brief. The 3.5 upper time limit may reduce user frustration at webpage 800 not fully being displayed following redirection. The lower time limit may be the minimum time for a user to fully grasp that redirection has occurred. The lower time limit could be 1.5, 1.6, 1.7, 1.8, 1.9, 2.0, 2.1, 2.2, 2.3, 2.4, or even 2.5 seconds. The upper time limit could be 3.4, 3.3, 3.2, 3.1, or even 3.0 seconds. The time period of between 1.5 and 3.5 seconds is merely exemplary.

The amount of time which the interactive searching display window is shown on top of webpage 800 may be dynamic, based on historical user experience. For example, if the processor determines that the user has interacted with the interactive searching window a predetermined number of times, and is pre-conditioned to recognize the display of the interactive searching window, the processor may display the interactive searching window on top of webpage 800 for a shorter period of time—i.e. 1.5, 1.6 or 1.7 seconds. If the processor determines that the user has not interacted with the interactive searching display window more than a predetermined number of times, the processor may display the interactive searching window on top of webpage 800 for a longer period of time—i.e. 3.3, 3.4 or 3.5 seconds. In some embodiments, the amount of display time may be shifted between the upper time limit and lower time limit depending on either historical experience or other factors.

Interactive searching display window 602 may contain maximize button 606, minimize button 608 and pin button 610. Pin button 610 may not be visible because the processor may have determined that there is not sufficient room on webpage 600 for interactive searching display window 602 to be pinned to one side of webpage 600.

Figure 7:
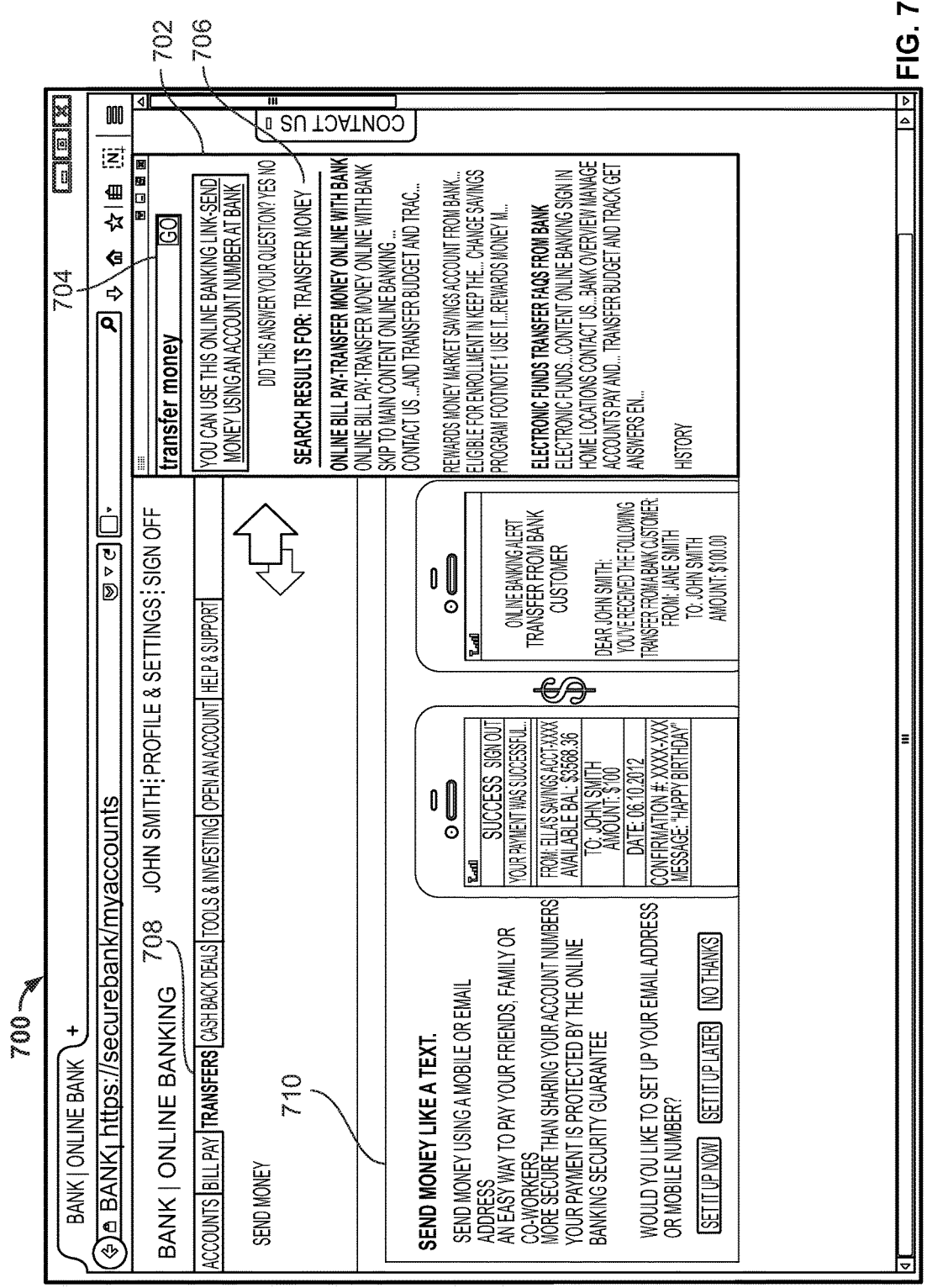
FIG. 7 shows an illustrative GUI in accordance with the principles of the invention.

FIG. 7 shows a GUI webpage. Webpage 500 may appear as webpage 700 after the time period of not less than 1.5 seconds and not more than 3.5 seconds has elapsed. Interactive searching display window 702 may be pinned to one side of webpage 700. Interactive searching display window 702 may retain the state of answer box 706 and search box 704, following redirection from webpage 500 to webpage 700.

Tab 708 may pertain to transfers. Box 710 may describe transferring of money in more detail. Transferring of money may be the answer to the user's question on webpage 700 of "transfer money".

Figure 8:
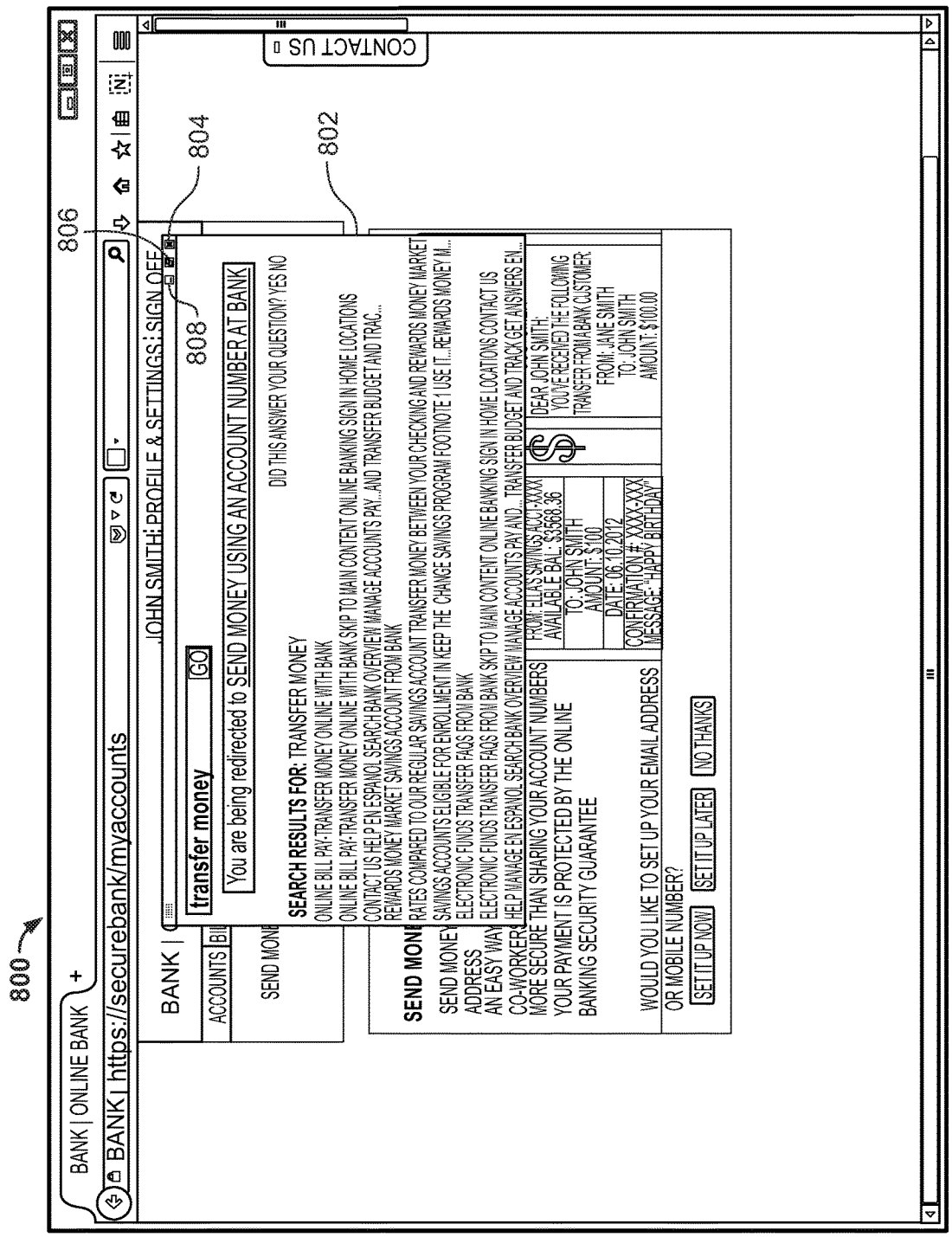
FIG. 8 shows an illustrative GUI in accordance with the principles of the invention.

FIG. 8 shows a GUI webpage. The user of webpage 600 may have been redirected to webpage 800. Interactive searching display window 802 is shown on top of webpage 800. Webpage 800 may remain active and usable while interactive searching display window is on top of webpage 800. Interactive searching display window may appear on top of webpage 800 for a time period of not less than 1.5 seconds and not more than 3.5 seconds. The time period of 1.5 to 3.5 seconds may allow the user to understand that he has been redirected to webpage 800. The appearance of interactive searching display window 802 on top of webpage 800 for a time period of 1.5 to 3.5 seconds may appear to the user to be brief, thereby minimizing user frustration.

Interactive searching display window 802 may contain close button 804, maximize button 806 and minimize button 808. A pin button may not be visible because the processor may have determined that there is not enough room on webpage 800 for interactive searching display window to be pinned to one side of webpage 800.

Figure 9:
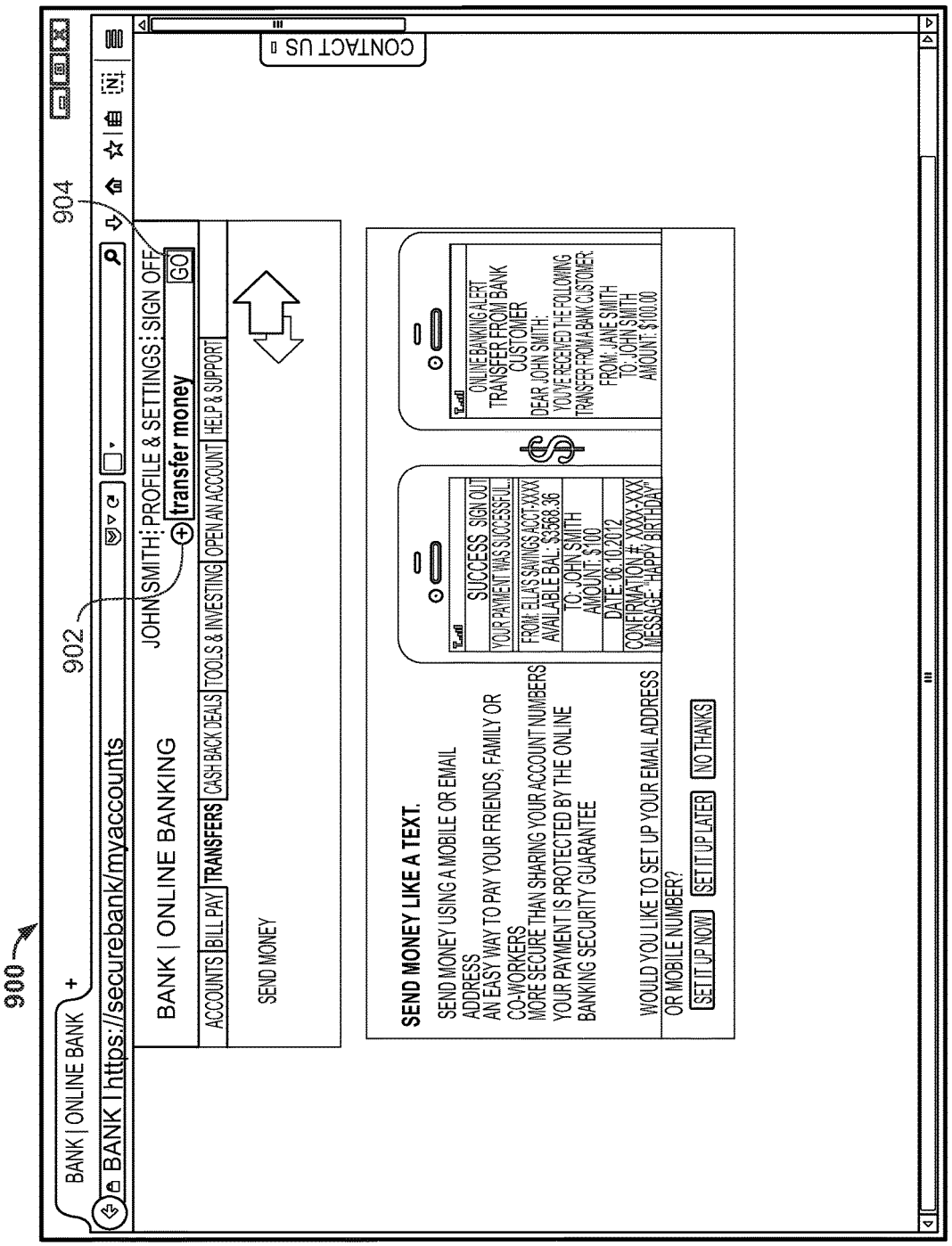
FIG. 9 shows an illustrative GUI in accordance with the principles of the invention.

FIG. 9 shows a GUI webpage. Webpage 800 may appear as webpage 900 after the time period of not less than 1.5 seconds and not more than 3.5 seconds has elapsed. The processor may have determined that there is not enough room on webpage 900 for an interactive searching window to be pinned to one side of webpage 900. After the time period of 1.5 to 3.5 seconds has elapsed, the interactive searching display window 802 may appear to move from on top of webpage 800 into plus icon 902. Interactive searching display window may be displayed as search box 904 and plus icon 902. The state of the answer box (not shown) and search box 904 may be maintained, following redirection from webpage 700 to webpage 900. The user may view the interactive searching display window in full view by clicking on plus icon 902.

Figure 10:
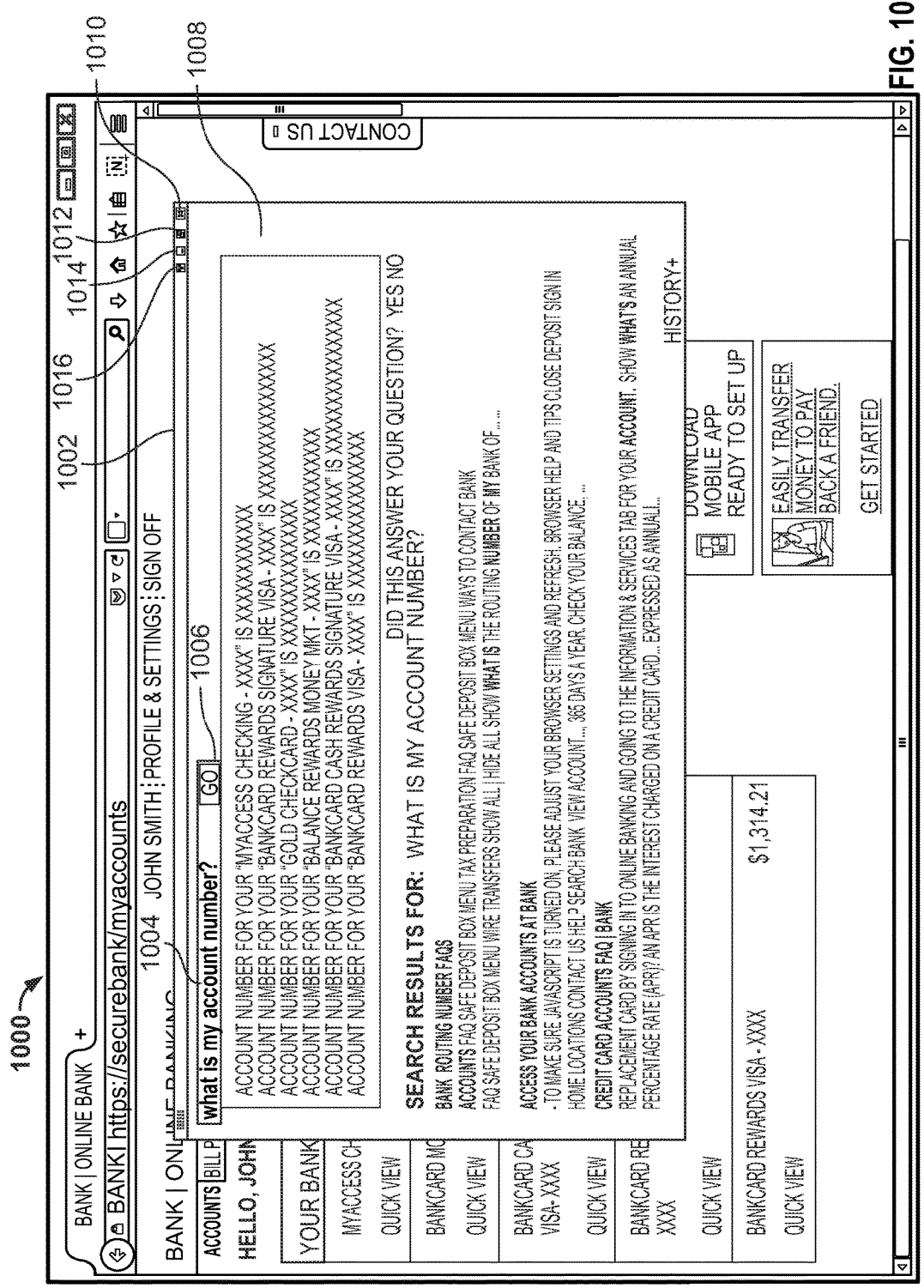
FIG. 10 shows an illustrative GUI in accordance with the principles of the invention.

FIG. 10 shows a GUI webpage. Interactive searching display window 1202 may be displayed on top of webpage 1000. The user may have typed "what is my account number?" into search box 1004. The user may have clicked "GO" button 1006. The processor may have determined that greater than a threshold probability exists that the processor can determine the answer to the user's question. The answer to the user's question may appear in answer box 1008. The answer to the user's question may be "Account number for your "my access checking account 1234" is 3908809000". The user may choose to move and pin interactive searching display window 1002 to one side of webpage 1000 using pin button 1016.

Figure 11:
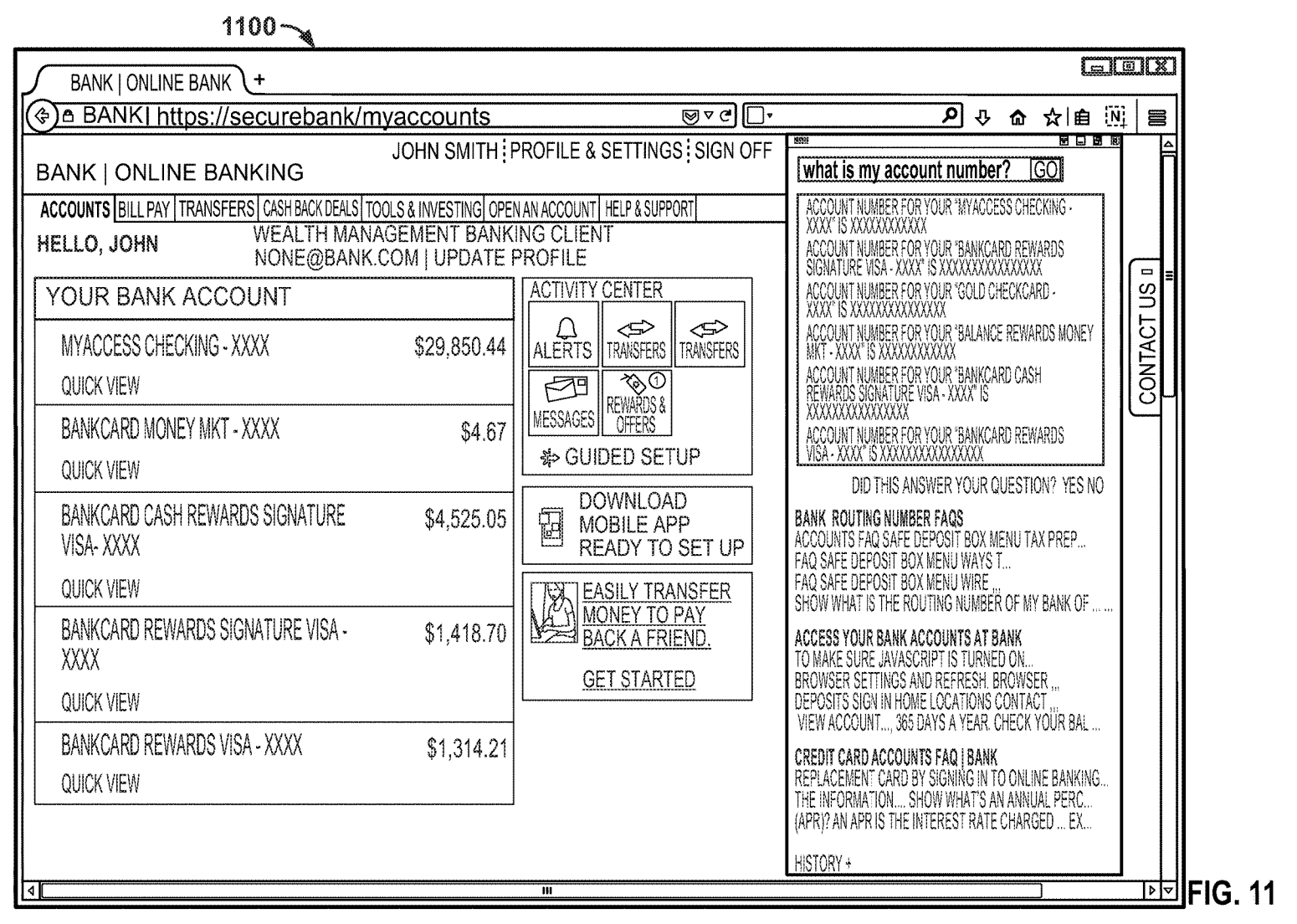

FIG. 11 shows a GUI webpage. Webpage 1000 may appear as webpage 1100 after a user uses the pin button to move and pin the interactive searching display window to one side of webpage 1100.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

The invention may be described in the general context of computer-executable instructions, such as program modules, being executed by a computer. Generally, program modules may include routines, programs, objects, components, data structures, etc., that perform particular tasks or store or process data structures, objects and other data types. The invention may also be practiced in distributed computing environments where tasks are performed by separate (local or remote) processing devices that are linked through a communications network.

In a distributed computing environment, program modules may be located in both local and remote computer storage media including memory storage devices. In a distributed computing environment, devices that perform the same or similar function may be viewed as being part of a "module" even if the devices are separate (whether local or remote) from each other.

Thus, methods and apparatus for navigational searching of a webpage are provided. Persons skilled in the art will appreciate that the present invention can be practiced by other than the described embodiments, which are presented for purposes of illustration rather than of limitation, and that the present invention is limited only by the claims that follow.

What is claimed is:

1. Apparatus for navigational searching on a webpage comprising:
    a first webpage;
    a processor; and
    an interactive searching display window located on the first webpage the window comprising:
        a search box which enables a user to type in a query;
        an answer box, which is configured to display an answer to the user's query, said answer being determined by the processor;
        a minimize button, which is configured to reduce a display area of the interactive searching display window;
        a maximize button, which is configured to increase the display area of the interactive searching display window; and
        a pin button which is configured to allow the user to pin the interactive searching display window to a specific place on the first webpage;
    the processor being further configured to:
        receive and process the user's query;
        determine that a probability that the answer to the user's query is found on a second webpage is greater than the probability that the answer to the user's query is found on the first webpage;
        automatically redirect the user to the second webpage;
        electronically notify the user, via a message in the answer box, that the user has been redirected to the second webpage; and
        display the interactive searching display window in a central location of the second webpage for a time period not less than 1.5 seconds and not more than 3.5 seconds.

2. The apparatus of claim 1, wherein the processor is further configured to move the interactive searching display window to one side of the second webpage after the time period of not less than 1.5 seconds and not more than 3.5 seconds has elapsed.

3. The apparatus of claim 2, wherein the processor is further configured to display the interactive searching display window pinned to one side of the second webpage.

4. The apparatus of claim 3, wherein the side is either a right side or a left side.

5. The apparatus of claim 3, wherein the side is either a top side or a bottom side.

6. The apparatus of claim 1, wherein the processor is further configured not to display the pin button to the user when the processor determines that there is no room on the second webpage for pinning.

7. The apparatus of claim 1, wherein the answer to the user's query is based at least in part on the user's personal information.

8. The apparatus of claim 1, wherein the answer to the user's query is based at least in part on prior user searches.

9. The apparatus of claim 1, wherein the processor is further configured to retain the state of the search box and the answer box, following redirection from the first webpage to the second webpage.

10. Apparatus for navigational searching on a webpage comprising:
    a first webpage;
    a processor; and
    an interactive searching display window comprising:
        a search box which enables a user to type in a query;
        an answer box, which is configured to display an answer to the user's query, said answer being determined by the processor;
        a minimize button, which is configured to reduce a display area of the interactive searching display window;
        a maximize button, which is configured to increase the display area of the interactive searching display window; and
        a pin button which is configured to allow the user to pin the interactive searching display window to a specific place on the webpage;
    the processor being further configured to:
        receive and process the user's query;
        determine that a level of probability that the answer to the user's query is found on one of a plurality of webpages is greater than the level of probability that the answer is found on the first webpage;
        display a plurality of webpage links in the answer box, said plurality of webpage links that correspond to the plurality of webpages;
        redirect the user to a second webpage in response to the user clicking on one of the plurality of webpage links, said webpage link corresponding to the second webpage; and
        display the interactive searching display window in a central location of the second webpage for a predetermined time period.

11. The apparatus of claim 10, wherein the processor is further configured to move the interactive searching display window to one side of the second webpage after the time period has elapsed.

12. The apparatus of claim 11, wherein the processor is further configured to display the interactive searching display window pinned to one side of the second webpage.

13. The apparatus of claim 12, wherein the side is either a right side or a left side.

14. The apparatus of claim 12, wherein the side is either a top side or a bottom side.

15. The apparatus of claim 10, wherein the processor is further configured not to display the pin button to the user when the processor determines that there is no room on the second webpage for pinning.

16. The apparatus of claim 10, wherein the answer to the user's query is based at least in part on the user's personal information.

17. The apparatus of claim 10, wherein the answer to the user's query is based at least in part on prior user searches.

18. The apparatus of claim 10, wherein the processor is further configured to retain the state of the search box and the answer box, following redirection from the first webpage to the second webpage.

19. One or more non-transitory computer-readable media storing computer-executable instructions which, when executed by a processor on a computer system, perform a method for navigational searching of a webpage comprising:
    displaying an interactive searching display window on a first webpage;
    displaying a search box, which enables a user to type in a query, on the interactive searching display window;
    receiving and processing the user's query;
    determining an answer to the user's query;
    displaying an answer box, which is configured to display the answer to the user's query;

displaying a minimize button, which is configured to reduce a display area of the interactive searching display window;
displaying a maximize button, which is configured to increase the display area of the interactive searching display window;
displaying a pin button which is configured to allow the user to pin the interactive searching display window to a specific place on the webpage;
determine that a level of probability that the answer to the user's query is found on one of a plurality of webpages is greater than the level of probability that the answer is found on the first webpage;
displaying a plurality of webpage links in the answer box, said plurality of webpage links that correspond to the plurality of webpages;
redirecting the user to a second webpage in response to the user clicking on one of the plurality of webpage links, said webpage link corresponding to the second webpage; and
displaying the interactive searching display window in a central location of the second webpage for a predetermined time period.

20. The method of claim 19, further comprising moving the interactive searching display window to one side of the second webpage after the time period has elapsed.

* * * * *